Patented Sept. 4, 1928.

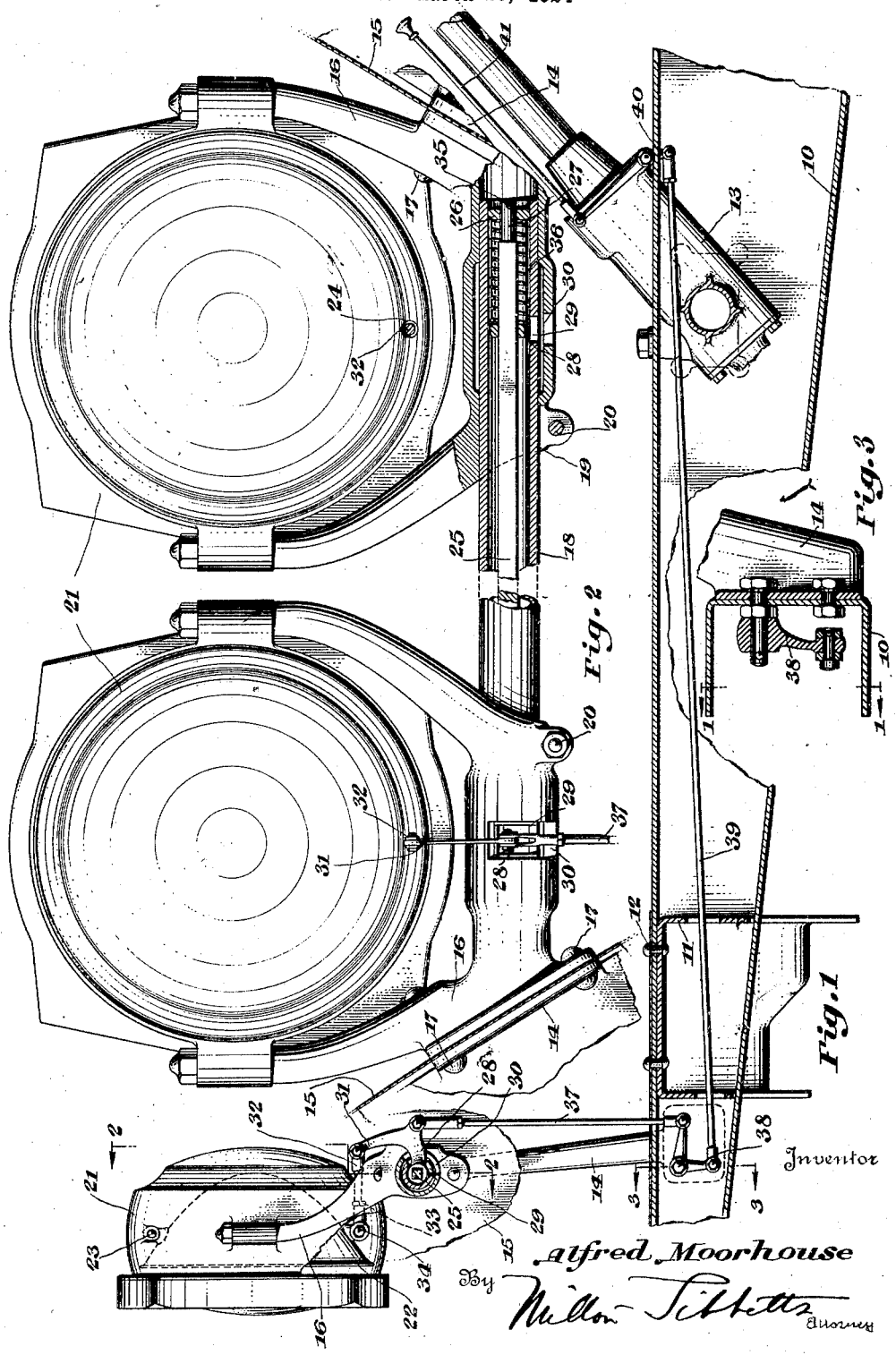

1,682,792

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed March 26, 1924. Serial No. 701,942.

This invention relates to motor vehicles and particularly to the lamps and the means for operating the light projecting devices of the lamps.

One of the objects of the invention is to provide a motor vehicle with a simple and inexpensive means for operating the light projecting devices.

Another object of the invention is to provide a motor vehicle with light projecting mechanism that will not rattle.

Another object of the invention is to combine the light projecting mechanism with the lamp supporting means of a motor vehicle.

Other objects of the invention will appear from the following description taken in connection with the drawings, which form a part of this specification, and in which:

Fig. 1 is a part section and part side elevation of the forward part of a motor vehicle embodying the invention, the section through the frame being on the line 1—1 of Fig. 3;

Fig. 2 is an enlarged view of the motor vehicle lamps and supporting means and the light projecting mechanism, being taken substantially on the line 2—2 of Fig. 1, and Fig. 3 is a transverse section through one of the cross members of the vehicle frame on the line 3—3 of Fig. 1.

Referring to the drawings, 10 represents one of the side members of a motor vehicle frame and 11 is a cross member which extends between the side members and is secured thereto by the usual rivets 12. 13 is a steering mechanism or steering post supported upon the vehicle frame in any desired manner. Forwardly of the steering post is an upright bracket 14, there being two of these brackets, one for each side member of the frame and secured thereto. These brackets 14 support the vehicle fenders, fragments of which are shown at 15 in Figs. 1 and 2.

Mounted at the upper end of each of the brackets 14, is a lamp bracket 16 and it will be seen that the fenders 15 are clamped between the lamp brackets and the brackets 14. Bolts or rivets 17 secure the lamp brackets to the brackets 14.

A tie rod or member in the form of a tube 18 extends between the lamp brackets 16 thereby forming a tie rod between the upper ends of the brackets 14. The tube 18 extends into tubular parts of the lamp bracket 16 as shown particularly in Fig. 2 and these tubular parts of the lamp bracket are split as at 19 so that the tube 18 adjacent its ends may be clamped within the lamp brackets as by the bolts 20. This rigidly secures the tube 18 to the lamp brackets and consequently to the ends of the brackets 14.

Supported upon the lamp brackets 16 are lamps 21 each of which lamps has a light projecting device, shown in the form of a tilting reflector 22, the reflector being pivoted as at 23 so that it may be moved to either deflect the light upwardly or downwardly on the road.

The body of each of the lamps 21 has an opening 24 therein for the passage of the operating mechanism for the light changing devices, as will be hereinafter described.

The means for operating the light changing device is supported by the member 18. A rock shaft 25 is supported in the tube 18 upon bronze bushings 26, the ends of the shaft 25 being cylindrical as shown at 27 so that the shaft may be turned in the bushings 26. The intermediate part of the shaft 25 is square in cross section as shown particularly at the middle part of Fig. 2 and upon this shaft are arranged a pair of operating levers 28 for the light projecting device. One of these levers 28 is arranged adjacent each end of the shaft 25 and it extends out through an opening 29 in the tube 18 and a coincident opening 30 in the cylindrical part of the lamp bracket 16. This is clearly illustrated in Figs. 1 and 2.

Each of these levers 28 has an upwardly extending arm 31 and a link 32, adjustable as at 33, connects the arm 31 with the light projecting device 22 for operating the latter. As shown, the link 32 is pivotally connected at 34 to the lower part of the reflector of the lamp so that as the shaft 25 is rocked the reflector 22 moves on its pivot 23.

The link 32 extends through the opening 24 above referred to and the opening thereby forms a guide for the link. This is important in that the walls of this opening 24 form the means for positioning the rock shaft 25 in the tube 18, as will be hereinafter described.

A pin 35 in each end of the rock shaft 25 prevents the bushing 26 from moving off of the end of the rock shaft and the bushing thereby forms an abutment at each end of the rock shaft. A spring 36 surrounds the rock shaft 25 at each end and is arranged between the abutment or bushing 26 and the adjacent lever 28, which lever is adapted to slide on the rock shaft though it turns with it because of the square hole in the lever. Thus the spring 36 at the right side of Fig. 2 pushes the lever 28 towards the left, which yielding movement is resisted by the wall of the opening 24 in the body of the lamp 21. A similar spring at the other end of the rock shaft 25 tends to push the other lever 28 towards the right and this is resisted by the wall of the opening 24 in the other lamp. These openings 24 thereby position the rock shaft 25 within the tube 18 and put a transverse tension on all of the joints between the lever and the reflector 22 so that there is no rattle of these parts. The tension of the spring 36 is enough only to prevent this rattle and consequently does not offer any great resistance to the rocking movement of the shaft 25.

The rock shaft 25 is under manual control from the driver's seat of the vehicle. The shaft is rocked by a rod 37 extending downwardly from one of the levers 28 to a bell crank lever 38 supported on the frame side member 10, a rod 39 extending from the bell crank lever 38 to a bell crank lever 40 supported adjacent the steering column 13, and a push rod 41 connected to the bell crank lever 40, the upper end of the push rod 41 being mounted within reach of the driver.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination of a pair of lamps each mounted upon a tubular base, a tubular section connecting the tubular bases, a light projecting device mounted in each lamp, a bearing in each end of the tubular section, a rock shaft mounted in the bearings within the tubular section, levers mounted upon the rock shaft, connections between the levers and the light projecting devices and springs upon the rock shaft between the levers and the bearings.

2. In a motor vehicle, the combination of a pair of brackets each having a tubular base, lamps mounted upon the brackets, a light projecting device in each lamp, a tubular section having its respective ends mounted in the tubular bases of the brackets, means for binding the tubular section and bases together, a collar mounted in each end of the tubular section, a rock shaft journaled in the collars within the tubular section, levers slidably mounted upon the shaft, springs upon the shaft between the collars and the levers, and linkage connections between the levers and the light projecting devices.

3. In a motor vehicle, the combination of a pair of brackets each having a tubular base with an enlarged slotted chamber, a lamp mounted on each of the brackets, a light projecting device mounted in each lamp, a tubular section having its respective ends mounted in the tubular bases, the tubular sections being provided with slots to register with the slots in the bases, a bearing in each end of the tubular section, a shaft journaled in the bearings within the tubular section, levers slidably mounted on the shaft and projecting through the registering slots, means for sustaining a pressure between the levers and the bearings, linkage connections between the levers and the light projecting devices and means for rocking the shaft.

4. In a motor vehicle, the combination with a pair of spaced lamps, each said lamp having a light projecting device therein and an opening in the body thereof, of a rock shaft having an abutment at each end, a lever slidably mounted on said rock shaft adjacent each end thereof, a link connecting each of said levers with one of said light projecting devices for rocking said devices, said links passing through said openings in the lamp bodies, and a spring arranged between each said abutment and said lever for placing lateral tension on the various joints to thereby prevent rattle.

5. In a motor vehicle, the combination of a pair of lamps having light projecting devices, a tube extending between said lamps, bushings arranged adjacent the ends of said tubes, a rock shaft mounted in said bushings, a lever mounted adjacent each end of said rock shaft and having connections to said light projecting devices, and a spring between each of said bushings and the adjacent lever.

In testimony whereof I affix my signature.

ALFRED MOORHOUSE.